A. J. STECKER.
LIQUID LEVEL INDICATOR.
APPLICATION FILED NOV. 23, 1908.
917,808.
Patented Apr. 13, 1909.
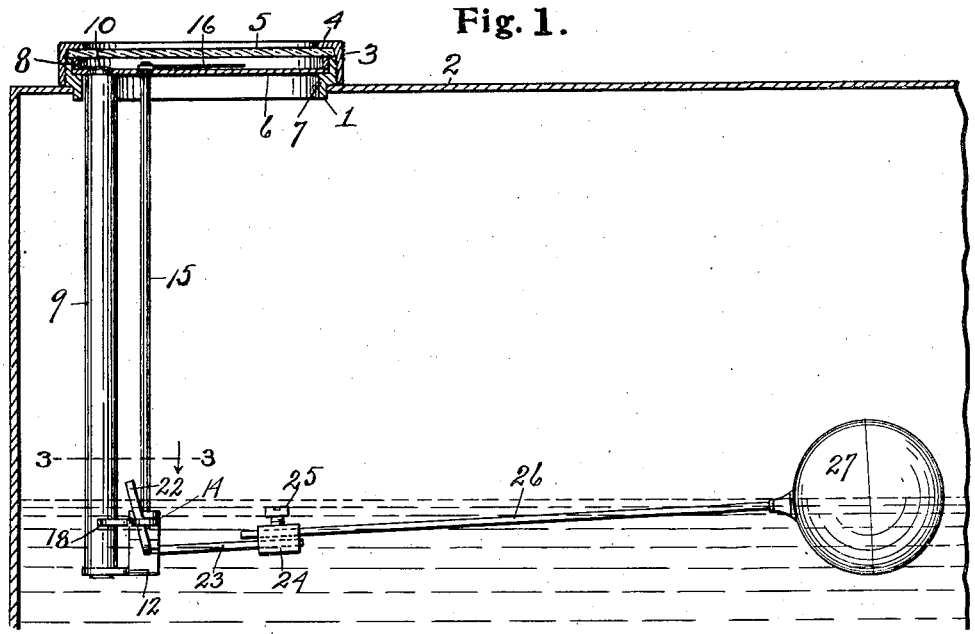
Fig. 1.
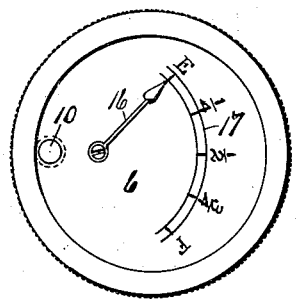
Fig. 2.
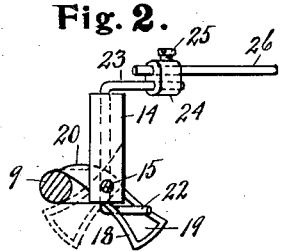
Fig. 3.
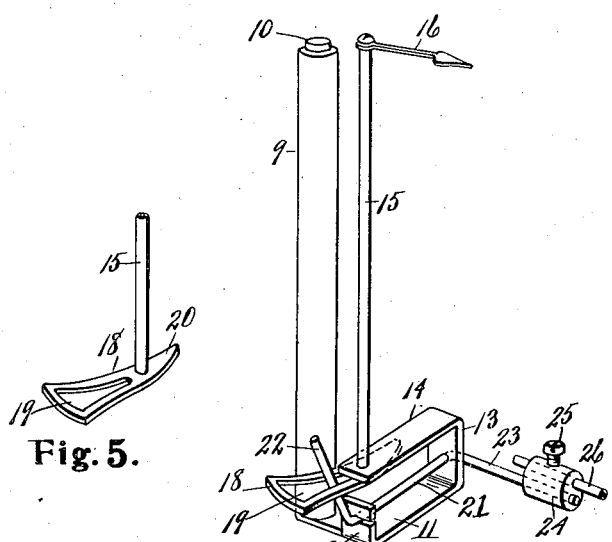
Fig. 5.
Fig. 4.
Witnesses
C. B. Baenziger.
J. G. Howlett.
Inventor
Alfred J. Stecker.
By T. A. Wheeler & Co.
Attorneys

UNITED STATES PATENT OFFICE.

ALFRED J. STECKER, OF DETROIT, MICHIGAN, ASSIGNOR TO FRED WARDELL, OF DETROIT, MICHIGAN.

LIQUID-LEVEL INDICATOR.

No. 917,808.  Specification of Letters Patent.  Patented April 13, 1909.

Application filed November 23, 1908. Serial No. 464,176.

*To all whom it may concern:*

Be it known that I, ALFRED J. STECKER, a citizen of the United States, residing at Detroit, in the county of Wayne, State of Michigan, have invented certain new and useful Improvements in Liquid-Level Indicators; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a liquid level indicator for tanks, and consists in the construction and arrangement of parts hereinafter more fully set forth and pointed out particularly in the claims.

The primary object of the invention is to provide a liquid level indicating device of comparatively simple and inexpensive construction, wherein the arrangement is such as to enable the liquid level of a gasolene tank or other vessel to be at all times accurately determined.

A further object is to provide a unitary structure of the character above described which may be quickly and easily placed in a tank, and wherein provision is made for adjusting said device to tanks of various sizes.

The above objects are attained by the structure illustrated in the accompanying drawings, in which:—

Figure 1 is a sectional view of a portion of a tank showing my indicating device or gage mounted therein, a portion of said device appearing in section. Fig. 2 is a plan view of the dial. Fig. 3 is a horizontal section as on line 3—3 of Fig. 1. Fig. 4 is a perspective view of the operative parts, the float rod being broken away. Fig. 5 is a perspective view of the lower end of the oscillatory shaft and the slotted arm mounted thereon.

Referring to the characters of reference, 1 designates a flanged ring of any suitable diameter which is adapted to be soldered or otherwise secured in a suitable opening in the top of the tank 2. The exterior of said ring is threaded to receive an internally threaded collar 3 which screws thereon and which is provided at its upper edge with a laterally projecting flange 4 adapted to extend onto the upper surface of a glass disk 5 which lies upon the upper edge of the ring 1. Below the disk 5 and spaced therefrom is a dial plate 6 which is supported upon a laterally projecting shoulder 7 of the ring 1. Resting upon the margin of the dial plate is an annular confining band 8 formed preferably of spring metal which is sprung into place within the ring 1 and which is of such width as to engage the lower side of the glass disk 5. By this arrangement when the collar 3 is screwed into place, all of said parts are securely confined within the ring 1.

Depending from the dial plate is a rod 9 which serves as a hanger and whose upper end is provided with a tenon 10 which is riveted in said plate, whereby said hanger is rigidly attached thereto. To the lower end of the hanger 9 is rigidly secured a bracket 11 having the vertical end portions 12 and 13 respectively and the horizontally extending portion 14 formed integral with and projecting from the end portion 13.

Journaled at its upper end in the dial plate 6 is a vertical rock shaft 15 having fixed to the upper end thereof an indicating hand 16 whose free end is adapted to sweep a graduated scale 17 on said plate which describes the arc of a circle and which is provided with suitable characters and figures indicating the quantity of liquid within the tank. The lower end of the shaft 15 is journaled in the free end of the horizontal supporting portion 14 of the bracket 11 and carries thereon below the plane of said horizontal support, an arm 18, the outer end of which is flaring and provided with a triangular shaped opening 19. The inner end of said arm extends some distance beyond the shaft 15, as shown at 20, for purposes hereinafter set forth.

Journaled in the end portions of the bracket 11 is a horizontal rock shaft 21 having at one end a crank arm 22 which extends upwardly and projects through the triangular opening 19 in the arm 18. The opposite end of said shaft 21 is provided with a horizontally extending arm 23 carrying upon the free end thereof a sleeve 24. Passing through said sleeve and adjustably secured therein by a set screw 25 is a rod 26 carrying at its free end a float 27. It will now be understood that as the float rises and falls, the shaft 21 will be actuated to swing the crank arm 22 and impart to the shaft 15 through the slotted arm 19 engaged by said crank arm, an oscillatory movement, which movement of the shaft 15 will cause the hand 16 to traverse the graduations on the dial plate, the position of said hand when at rest indicating the quantity of liquid in the tank. The position of the hand in Fig. 2 indicates that the tank is empty. Were the hand at the opposite end of the graduated arc or quadrant, it would indicate that the tank was full. The graduations in the arc between the letters E and F indicate the intermediate levels of the liquid within the tank. By this arrangement the quantity of liquid in the tank may be readily determined at all times by reference to the position of the indicating hand on the dial plate. By regulating the length of the float rod 26 the gage may be adjusted for a tank of any capacity.

It will be observed that because of the shape of the opening 19, the crank arm 22 cannot become wedged therein when swung to the limit of its movement in either direction. It will further be observed that the connection between the shafts 15 and 21 is such that motion is imparted from the latter to the former with but comparatively little friction, making the gage very sensitive in its operation.

The projecting end 20 of the arm 18 when said arm is swung to the limit of its movement to the right, strikes the hanger 9 which serves as a stop for said arm to prevent it traveling so far as to allow the crank arm 22 to pass from the opening 19 therein. When swinging to the limit of its movement in the opposite direction, said arm 18 is arrested by engaging said hanger 9, as shown by dotted lines in Fig. 3.

The parts being all attached directly to the dial plate and the dial plate being secured within the ring 1, enables the gage or liquid level indicator to be quickly and easily mounted in a tank without disturbing the operative parts.

Having thus fully set forth my invention, what I claim as new and desire to secure by Letters Patent, is:—

1. A liquid level indicator, comprising a hanger, means for supporting said hanger within a tank, a dial plate, a vertical shaft journaled at its upper end in said dial plate, an indicating hand on the upper end of said shaft, a bracket on the lower end of said hanger, the lower end of said shaft being journaled in said bracket, an apertured arm mounted on said shaft and movable therewith, a second shaft also journaled in said bracket having a crank arm engaging freely in the aperture of said first mentioned arm, a float, and means connecting said float with said second shaft.

2. A liquid level indicator, comprising a hanger, means for supporting said hanger within a tank, a dial plate, a bracket supported on said hanger, a vertical shaft supported by said bracket, an indicating hand on said shaft over said dial plate, a slotted arm on the lower end of said vertical shaft, a horizontal shaft supported by said bracket, a crank arm on said horizontal shaft engaging in said slotted arm, a float, and means connecting said float to said horizontal shaft.

3. A liquid level indicator, comprising a ring adapted to be seated in the top of a tank, said ring having an annular shoulder therein, a dial plate within the ring supported on said shoulder, means for confining said dial plate in place, a hanger depending from and secured to said dial plate having a bracket at its lower end, a vertical shaft journaled at its upper end in said dial plate and at its lower end in said bracket, a hand on the upper end of said shaft, an actuating arm on the lower end of said shaft, a horizontal shaft journaled in said bracket, an arm on said horizontal shaft freely engaging the arm on the vertical shaft, a float, and an arm carrying said float attached to the horizontal shaft.

In testimony whereof, I sign this specification in the presence of two witnesses.

ALFRED J. STECKER.

Witnesses:
O. B. BAENZIGER,
I. G. HOWLETT.